United States Patent [19]

Nagata et al.

[11] Patent Number: 5,585,985
[45] Date of Patent: *Dec. 17, 1996

[54] MAGNETO-RESISTIVE HEAD INCLUDING A FILM OF HARD MAGNETIC MATERIAL

[75] Inventors: Yuji Nagata, Yao; Satoru Mitani, Hirakata; Kazuo Nakamura, Toyonaka, all of Japan

[73] Assignee: Matsushita Electric Industrial Co., Ltd., Osaka-fu, Japan

[*] Notice: The term of this patent shall not extend beyond the expiration date of Pat. No. 5,412,524.

[21] Appl. No.: 378,593

[22] Filed: Jan. 26, 1995

Related U.S. Application Data

[63] Continuation of Ser. No. 985,219, Dec. 3, 1992, Pat. No. 5,412,524.

[30] Foreign Application Priority Data

Dec. 5, 1991 [JP] Japan ................... 3-321640

[51] Int. Cl.$^6$ .................. G11B 5/127; G01R 33/02
[52] U.S. Cl. .................. 360/113; 338/32 R; 324/252
[58] Field of Search .................. 360/113, 125, 360/126; 338/32 R; 324/252

[56] References Cited

U.S. PATENT DOCUMENTS

| | | | |
|---|---|---|---|
| 3,840,898 | 10/1974 | Bajorek et al. | 360/113 |
| 4,052,748 | 10/1977 | Kuijk | 360/113 |
| 4,103,315 | 7/1978 | Hempstead et al. | 360/110 |
| 4,142,218 | 2/1979 | Gorter | 360/113 |
| 4,319,188 | 3/1982 | Ito et al. | 324/173 |
| 4,535,375 | 8/1985 | Mowry et al. | 360/113 |
| 4,556,925 | 12/1985 | Suengaga et al. | 360/113 |
| 4,639,806 | 1/1987 | Kira et al. | 360/113 |
| 5,005,096 | 4/1991 | Krounbi et al. | 360/113 |
| 5,402,292 | 3/1995 | Komada et al. | 360/113 |

FOREIGN PATENT DOCUMENTS

| | | | |
|---|---|---|---|
| 50-134624 | 10/1975 | Japan | 360/113 |
| 58-192391 | 11/1983 | Japan | 360/113 |
| 62-66413 | 3/1987 | Japan | 360/113 |
| 2019638 | 10/1979 | United Kingdom | 360/113 |

OTHER PUBLICATIONS

IBM Technical Bulletin, vol. 20, No. 2, Jul. 1977, Armonk, NY, pp. 791–793.

*Primary Examiner*—Jefferson Evans
*Attorney, Agent, or Firm*—Wenderoth, Lind & Ponack

[57] ABSTRACT

A hard magnetic thin film magnetized in one direction is disposed on or in the vicinity of a magneto-resistive element upon which inclined electrodes are formed. A magnetic field from the hard magnetic film magnetizes the magneto-resistive element stably so that the element has a single magnetic domain. Thus, the magneto-resistive head is remarkably stable with respect to the disturbance magnetic field and inhibits Barkhausen noise from being produced. As a result, the magneto-resistive head reproduces stably and with an improved S/N ratio.

7 Claims, 6 Drawing Sheets

MAGNETO-RESISTIVE HEAD INCLUDING A FILM OF HARD MAGNETIC MATERIAL

This is a Continuation application of Ser. No. 07/985,219, filed Dec. 3, 1992, now U.S. Pat. No. 5,412,524.

BACKGROUND OF THE INVENTION

1. Field of the Invention

The present invention generally relates to a magnetic head which is mounted on a magnetic recording, reproducing apparatus for recording/reproducing the information stored on a magnetic recording medium. More particularly, the present invention relates to a magneto-resistive head.

2. Description of the Prior art

A conventional magneto-resistive head shown in FIG. 4 has been disclosed in Japanese Laid-Open Patent Publication No. 50-134624. A gap insulating layer 52, a rectangular magneto-resistive element 53 of a Ni—Fe alloy thin film or the like, a pair of electrodes 54a, 54b, inclined electrodes 57a, 57b, 57c, 57d, 57e, a front yoke 56 and a back yoke 58 and so on for guiding magnetic signal flux stored on the magnetic recording medium from the magnetic tape sliding face 55 to the magneto-resistive element are sequentially laminated on a magnetic base plate 51 through an insulating layer (not shown). The magneto-resistive head is connected to an exterior circuit through terminals 59a, 59b. The magneto-resistive element must be of a single magnetic domain and have a specific direction of magnetization in order to operate normally in the conventional magneto-resistive head. FIG. 5 shows an essential portion of the magneto-resistive element. When the driving current flows in the direction of reference numeral 62, the initial magnetization of the magneto-resistive element must be in the direction shown by reference numeral 61.

The reasons for this will be described hereinafter. If the magneto-resistive element were magnetized in mutually opposite directions as shown by reference numerals 61, 66 in FIG. 5, the change in resistance in each portion of the element would become reverse in terms of polarity when the signal magnetic field 64 flows into the magneto-resistive element. This effect extremely reduces the output. Because the reverse direction of magnetization exists within the magneto-resistive element, Barkhausen noise can be generated.

In the conventional type of magneto-resistive head, therefore, the magnetizing direction within the magneto-resistive element should be in direction 61.

However, in the conventional magneto-resistive head, the magnetizing direction changes in a disturbance magnetic field of approximately 1600 A/m. The reproducing output thus becomes unstable and includes noise.

SUMMARY OF THE INVENTION

Accordingly, an object of the present invention is to substantially eliminate the above-discussed drawbacks inherent in the prior art.

More specifically, an object of the present invention is to provide an improved magneto-resistive head which exhibits improved stability with respect to the disturbance magnetic field, and which exhibits superior reproducing output by inhibiting Barkhausen noise from being produced.

In accomplishing these and other objects, the present invention provides a magneto-resistive head having a hard magnetic film magnetized in a specific direction to apply a magnetic field in the longitudinal direction of a magneto-resistive element on which inclined electrodes are formed. The hard magnetic film magnetized in one specific direction makes the magnetic domain of the magneto-resistive element a stable single magnetic domain. As a result, the magneto-resistive head of the present invention hardly produces Barkhausen noise. Also, the reproducing output is extremely stable with respect to the disturbance magnetic field.

BRIEF DESCRIPTION OF THE DRAWINGS

These and other objects and features of the present invention will become apparent from the following description of the preferred embodiment thereof made with reference to the accompanying drawings, in which.

DETAILED DESCRIPTION OF THE INVENTION

Figure 1:
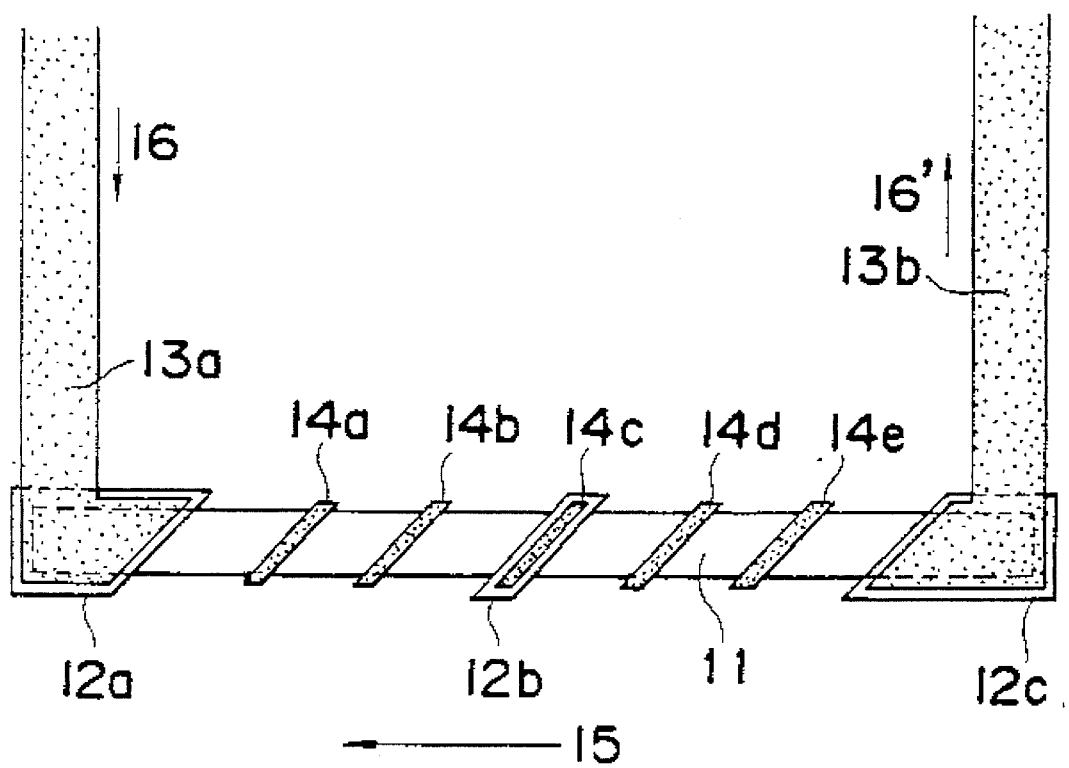
FIG. 1 is a plan view of a portion of a first preferred embodiment of a magneto-resistive head according to the present invention.

Before the description of the present invention proceeds, it is to be noted that like parts are designated by like reference numerals throughout the accompanying drawings.

FIG. 1 shows a magneto-resistive element of a first preferred embodiment of the present invention. In the first embodiment, a rectangular magneto-resistive element 11 is formed on a magnetic base plate (not shown) of a Ni—Zn ferrite or the like. Hard magnetic layers 12a, 12b, 12c of a Co—P alloy thin film or a Co—Pt alloy thin film or the like are formed on the magneto-resistive element. Electrodes 13a, 13b and an inclined electrode 14c are formed on, and have a shape similar to upper surfaces of the magnetic layers. The other inclined electrodes 14a, 14b, 14d, 14e are formed directly on the magneto-resistive element. With the above structure so fabricated, the magneto-resistive head is magnetized in the longitudinal direction 15 of the magneto-resistive element as shown. The driving current flows in the direction of arrow 16.

Figure 6:
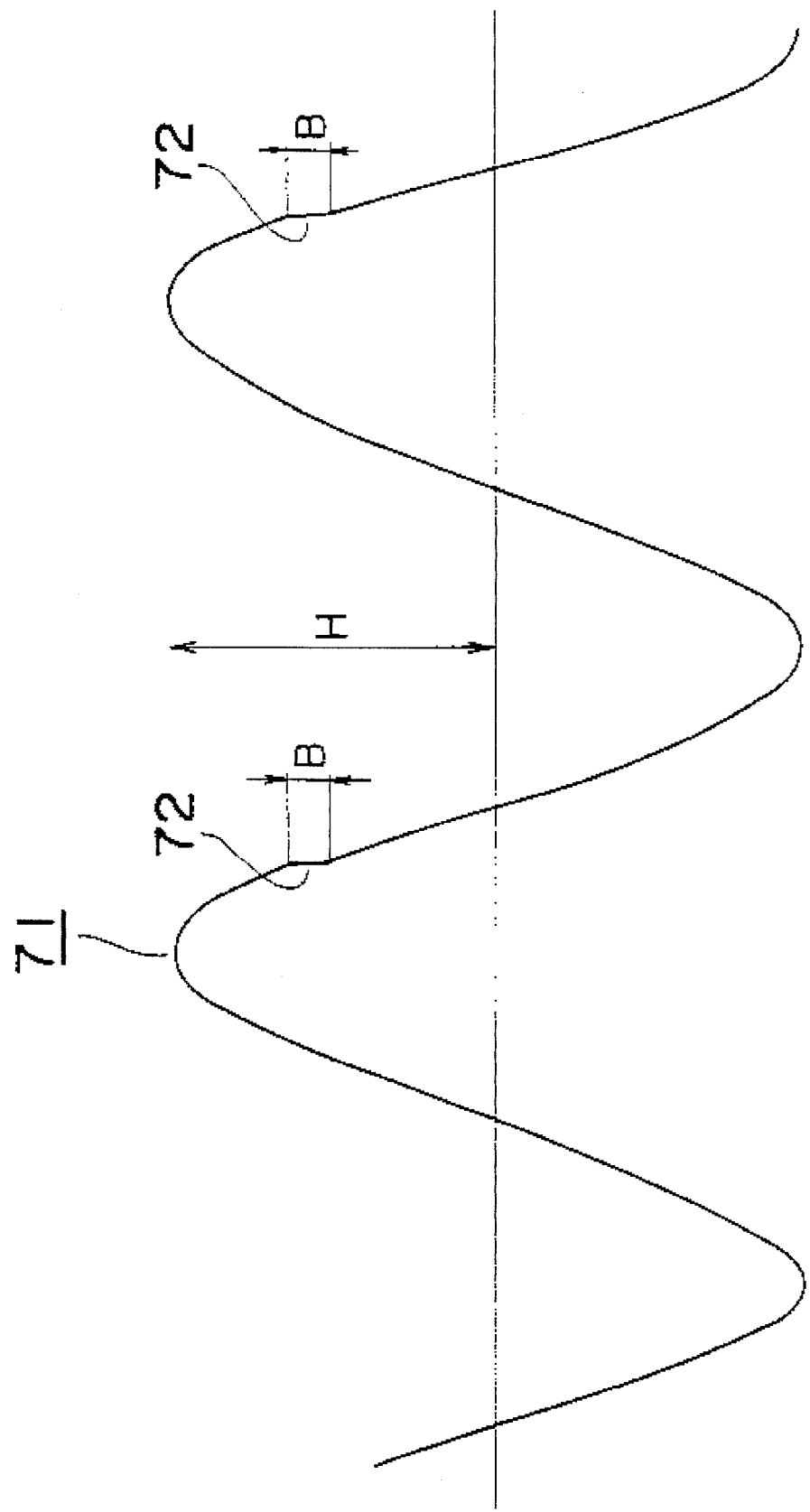
FIG. 6 shows a reproducing waveform with Barkhausen noise.

The magneto-resistive head of the first embodiment does not give rise to a large amount of Barkhausen noise. Generally, Barkhausen noise is present in the form shown in FIG. 6. Namely, FIG. 6 shows a reproducing waveform 71 of the present embodiment, wherein jumps 72 appear in the reproducing waveform. The magnitude of the Barkhausen noise can be expressed by the ratio between the amplitude H of the reproducing waveform and the amplitude B of the jumps, i.e., B/H. The ratio B/H of the magneto-resistive head of the present embodiment is less than 1%. On the contrary, the reproducing output of the conventional magneto-resistive head, which does not have a hard magnetic film, is lower, by about ½ to ⅕, than the present invention, in a disturbing magnetic field less than 900 A/m, and has an unstable reproducing output whereby the Barkhausen noise is so great that the ratio B/H is more than 5%.

The configuration of the hard magnetic film is determined in accordance with the reproduction sensitivity of the magneto-resistive element and the stability with respect to the disturbance magnetic field. Namely, the greater the number of hard magnetic film portions that are used, the stronger the magnetic field applied to the magneto-resistive element, thus increasing the stability with respect to the disturbance magnetic field. Further, the greater the number of hard magnetic film portions that are used, the more the magnetization of the magneto-resistive element lowers the sensitivity of the head because magnetization in the desired direction becomes difficult in accordance with the signal magnetic field. In the actual magneto-resistive head, the number of the hard magnetic layers (portions) are determined taking these points into consideration. In the first embodiment of the present invention, the track width is approximately 70 µm. The three hard magnetic layers are discrete portions of a Co—Pt magnetic thin film, have thicknesses of 0.15 µm, and are disposed at the end portions and at the center of the magneto-resistive element as spaced from one another by intervals of approximately 40 µm. This magneto-resistive head is stable with respect to a disturbance magnetic field of the approximately 16000 A/m. Only two hard magnetic layers may be provided as disposed at the end portions of the magneto-resistive element with an approximately 90 µm interval therebetween. In other words, the layer of the Co—Pt thin film at the central portion of the magneto-resistive element may be omitted. In this case, the reproduction sensitivity is improved by approximately 2 dB and the stability with respect to the disturbance magnetic field is lowered approximately one half to 8000 A/m. Also, the Barkhausen noise (B/H) is less than 1%. Furthermore, it is possible to space the thin layers of Co—Pt from one another at intervals less than those mentioned above. However, if the spaces between the thin layers of Co—Pt is less than 10 µm, the magnetic field generated from the thin film of Co—Pt is so strong that the reproducing output is ⅓ that of the first embodiment, whereby the reproducing capability is insufficient.

Because the layers of the hard magnetic film are disposed at the same locations as the electrodes in the first preferred embodiment of the present invention, a large reproduction sensitivity can be achieved without any restrictions on the effective sensitivity portion of the magneto-resistive element.

Figure 2:
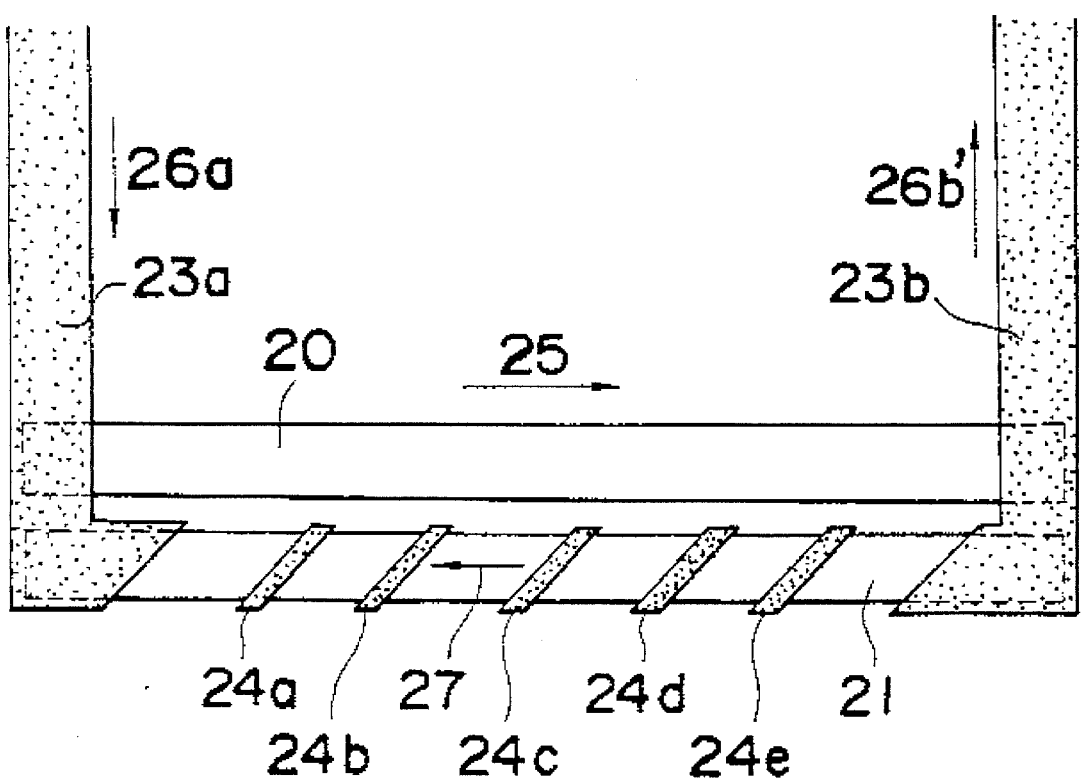
FIG. 2 is a plan view of a portion of a second preferred embodiment of a magneto-resistive head according to the present invention.

FIG. 2 shows a second embodiment of the present invention. Electrodes 24a, 24b, 24c, 24d, 24e, inclined with respect to the longitudinal direction of the magneto-resistive element 21, and electrodes 23a and 23b are formed on the magneto-resistive element 21 similar to the embodiment of FIG. 1. The second embodiment of FIG. 2 is different from the first preferred embodiment of FIG. 1 with respect to the hard magnetic film. Namely, a hard magnetic film 20 is located several µm away, on the terminal side, from the magneto-resistive element 21. The hard magnetic film is a Co—Pt thin film similar to that of the first embodiment. The width of the film 20 is 10 µm, the film thickness is 0.15 µm, and the length thereof is approximately 100 µm which are almost same as those dimensions of the magneto-resistive element. The hard magnetic film is magnetized in direction 25. Due to the leaking magnetic field from the film, the magneto-resistive element is magnetized in the direction 27. The driving current flows in the direction of arrows 26a, 26b. The second embodiment of the magnetic-resistive head is stable with respect to a disturbance magnetic field of approximately 16000 A/m as in the first preferred embodiment.

Figure 3:
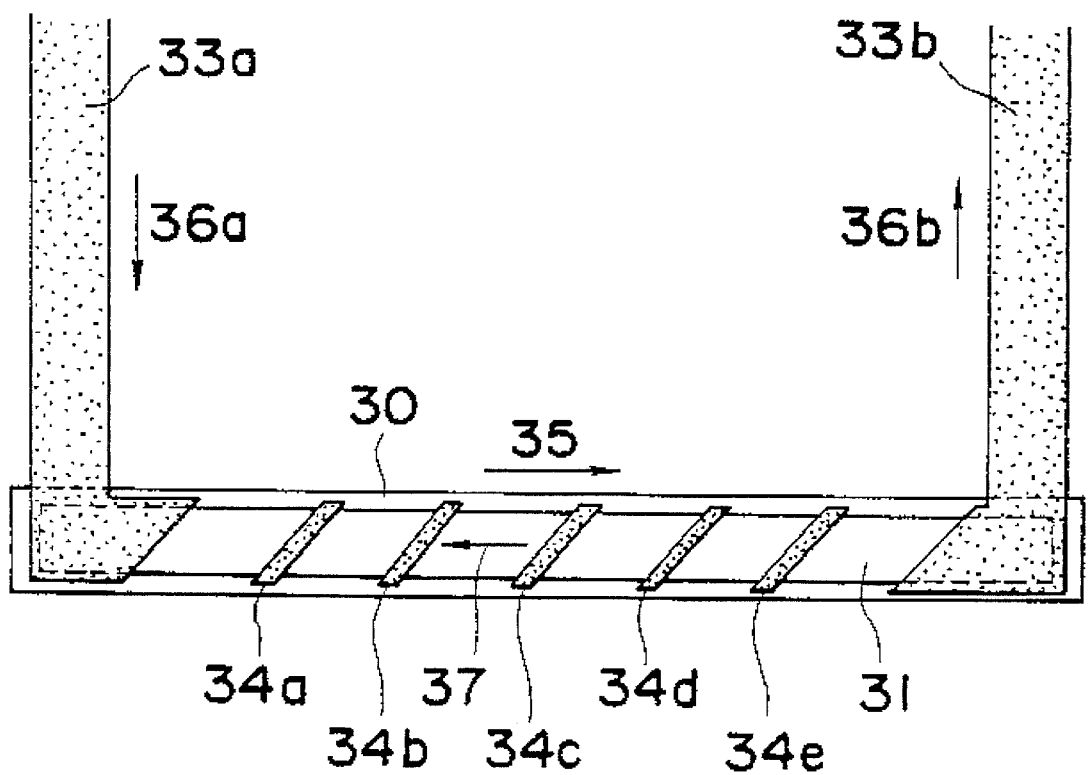
FIG. 3 is a plan view of a portion of a third preferred embodiment of a magneto-resistive head according to the present invention.
Figure 4:
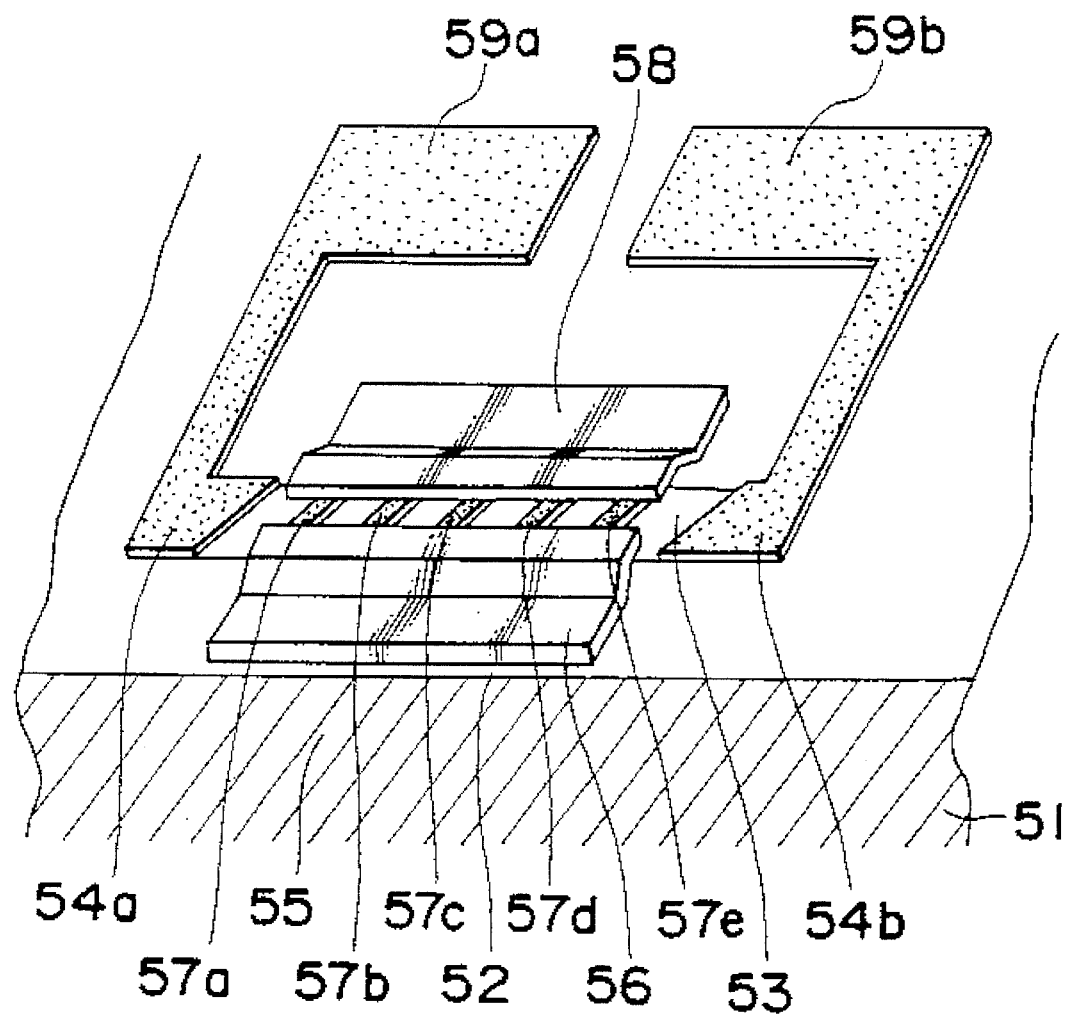
FIG. 4 is a perspective view of an outer part of a conventional magneto-resistive head.
Figure 5:
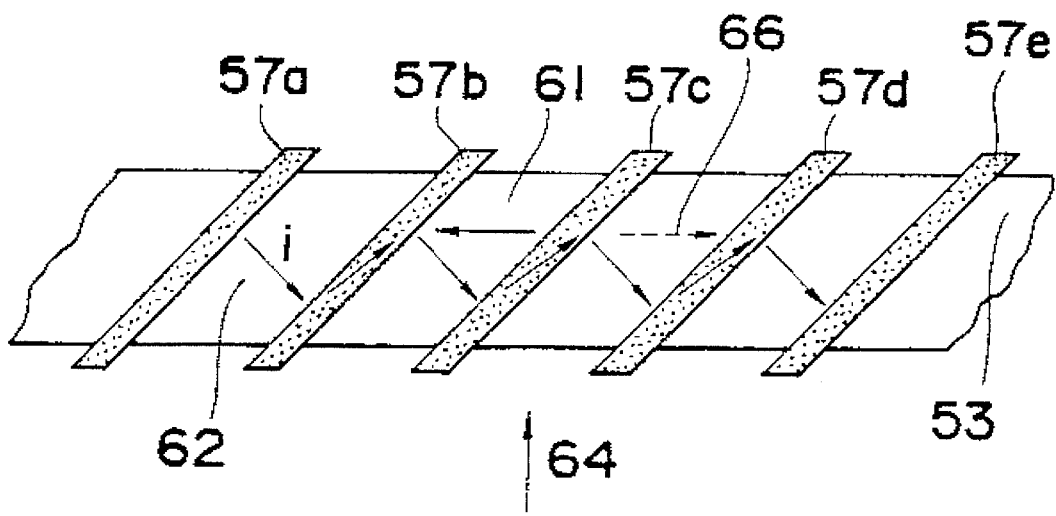
FIG. 5 is an enlarged view of an essential portion of the conventional magneto-resistive head.

FIG. 3 shows a third embodiment of the present invention. Electrodes 33a, 33b and inclined electrodes 34a, 34b, 34c, 34d, 34e are formed on a magneto-resistive element 31 as in the embodiment of FIG. 1. The third embodiment of FIG. 3 is different from the first preferred embodiment of FIG. 1 and the second preferred embodiment of FIG. 2 with respect to the location of the hard magnetic film. Specifically, the hard magnetic film 30 is formed immediately under the magneto-resistive element 31. In this case, an insulating layer (not shown) of SiO2 or the like and having a thickness of 1 µm is formed as an intermediate layer between the magneto-resistive element 31 and the hard magnetic film 30. The hard magnetic film is a Co—Pt thin film as in the first and second embodiments. The shape of the film 30 is almost the same as that of the magneto-resistive element, and the thickness of the film 30 is 0.15 µm. The hard magnetic film is magnetized in the direction 35 and due to the leaking magnetic field of the film the magneto-resistive element is magnetized in direction 37. The driving current is represented by reference numerals 36a, 36b. The third embodiment of the magneto-resistive head is stable with respect to a disturbance magnetic field of approximately 16000 A/m as in the first and second embodiments.

In the magneto-resistive head of the present invention, the hard magnetic thin film for applying the magnetic field in the longitudinal direction of the magneto-resistive element is arranged on or in the vicinity of the MR element upon which the inclined electrodes are disposed. Thus, the head is remarkably stable with respect to the disturbance magnetic field. Because of this stability, i.e. the single magnetic domain of the magneto-resistive element, superior reproducing output can be obtained by the suppression of the Barkhausen noise.

Although a magnetic base plate such as Ni—Zn ferrite or the like is used as a base plate in the first, second, and third embodiments, the same effect can be obtained by forming the hard magnetic thin film on a non-magnetic ceramic base plate.

Although the present invention has been fully described by way of examples with reference to the accompanying drawings, it is to be noted that various changes and modifications will be apparent to those skilled in the art. Therefore, unless such changes and modifications otherwise depart from the scope of the present invention, they should be construed as included therein.

What is claimed is:

1. A magneto-resistive head comprising: a base plate; a substantially rectangular magneto-resistive element extending along the base plate; a plurality of electrodes disposed over said magneto-resistive element and extending longitudinally in a direction that is oblique to the lengthwise direction of said substantially rectangular magneto-resistive element; and a plurality of discrete hard magnetic film portions applying a magnetic field in the longitudinal direction of said magneto-resistive element, one of said hard magnetic film portions being interposed between said magneto-resistive element and one of said plurality of electrodes, said one of said hard magnetic film portions contacting said magneto-resistive element, adjacent ones of all of said hard magnetic film portions being spaced apart from one another in said longitudinal direction of the magneto-resistive element by at least 10 µm, and wherein two of said plurality of electrodes are disposed directly on said magneto-resistive element.

2. A magneto-resistive head as claimed in claim 1, wherein said one of said discrete portions has a shape similar to that of said one of the electrodes.

3. A magneto-resistive head as claimed in claim 1, wherein said film of hard magnetic material consists of three discrete portions of hard magnetic material, two of said discrete portions being located at opposite sides of said substantially rectangular magneto-resistive element, respectively, in the lengthwise direction thereof, and said one of said discrete portions being disposed intermediate said two discrete portions.

4. A magneto-resistive head as claimed in claim 3, wherein said one of said discrete portions has a shape similar to that of said one of the electrodes.

5. A magneto-resistive head as claimed in claim 1, further comprising a pair of terminal electrodes disposed over said magneto-resistive element, two of said plurality of hard magnetic film portions being interposed between said magneto-resistive element and said terminal electrodes, respectively.

6. A magneto-resistive head as claimed in claim 5, wherein said one of said plurality of electrodes and said two of said plurality of electrodes are disposed between said terminal electrodes along the lengthwise direction of said magneto-resistive element.

7. A magneto-resistive head as claimed in claim 6, wherein said one of said plurality of electrodes is disposed between said two of said plurality of electrodes along the lengthwise direction of said magneto-resistive element.

* * * * *